United States Patent
Procopio et al.

(10) Patent No.: US 9,268,802 B2
(45) Date of Patent: Feb. 23, 2016

(54) SYSTEM AND METHOD FOR END-TO-END EXPOSURE OF EXPORTED REPRESENTATIONS OF NATIVE DATA TYPES TO THIRD-PARTY APPLICATIONS

(71) Applicant: Google Inc., Mountain View, CA (US)

(72) Inventors: Michael Jeffrey Procopio, Boulder, CO (US); Brian Lewis Cairns, Boulder, CO (US)

(73) Assignee: GOOGLE INC., Mountain View, CA (US)

( * ) Notice: Subject to any disclaimer, the term of this patent is extended or adjusted under 35 U.S.C. 154(b) by 118 days.

(21) Appl. No.: 13/833,479

(22) Filed: Mar. 15, 2013

(65) Prior Publication Data

US 2013/0346453 A1   Dec. 26, 2013

Related U.S. Application Data

(60) Provisional application No. 61/664,527, filed on Jun. 26, 2012.

(51) Int. Cl.
*G06F 17/30* (2006.01)

(52) U.S. Cl.
CPC .... *G06F 17/30292* (2013.01); *G06F 17/30179* (2013.01); *G06F 17/30569* (2013.01); *G06F 17/30864* (2013.01)

(58) Field of Classification Search
CPC ............................................... G06F 17/30179
USPC ......................................................... 707/809
See application file for complete search history.

(56) References Cited

U.S. PATENT DOCUMENTS

| | | | |
|---|---|---|---|
| 6,092,114 A | 7/2000 | Shaffer et al. | |
| 7,065,588 B2 * | 6/2006 | Konda et al. | 709/246 |
| 7,613,798 B2 * | 11/2009 | Mickeleit | 709/223 |
| 2003/0041095 A1 * | 2/2003 | Konda et al. | 709/201 |
| 2004/0030995 A1 * | 2/2004 | Bhogal et al. | 715/523 |
| 2005/0200887 A1 * | 9/2005 | Bai | 358/1.15 |
| 2008/0222517 A1 * | 9/2008 | Halim et al. | 715/236 |
| 2009/0193030 A1 * | 7/2009 | Gorsev et al. | 707/10 |
| 2010/0325155 A1 | 12/2010 | Skinner et al. | |
| 2011/0296048 A1 | 12/2011 | Knox et al. | |
| 2012/0278805 A1 * | 11/2012 | Shin et al. | 718/1 |

OTHER PUBLICATIONS

International Search Report and Written Opinion dated Sep. 2, 2013 in International Application No. PCT/US2013/043255.

* cited by examiner

*Primary Examiner* — Baoquoc To
(74) *Attorney, Agent, or Firm* — Ropes & Gray LLP (57) ABSTRACT

Systems and methods are disclosed herein for exporting a file to an application. A processor receives a request from a user for access to a file stored on a web-based storage system. The request includes a designation of an application to open the file, and the file is associated with a native format. The processor determines that the application is not configured to import the file in the native format and determines whether the file can be converted to an importable format that can be imported by the application. The processor converts the file from the native format to the importable format and exports the converted file in the importable format to the application, which opens the converted file.

14 Claims, 8 Drawing Sheets

FIG. 1

| NATIVE FILE ID | WHOSE FILE? | FORMAT | ASSOCIATED APPLICATION(S) |
|---|---|---|---|
| 514 | USER A | TEXT | V |
| 765 | USER B | IMAGE | X |
| 238 | USER C | PRESENTATION | Z |
| 1574 | USER B | SPREADSHEET | Y |

FIG. 2

| APPLICATION | IMPORTABLE FORMAT(S) | EXPORTABLE FORMAT(S) |
|---|---|---|
| V | PDF, PLAINTEXT, OPENDOCUMENT | PDF, PLAINTEXT, HTML, OPENDOCUMENT, RTF, DOC |
| W | PDF | |
| X | JPEG, PNG | PDF, JPEG, PNG |
| Y | XLS | PDF, OPENDOCUMENT, XLS |
| Z | | PDF, PPT |

SYSTEM AND METHOD FOR END-TO-END EXPOSURE OF EXPORTED REPRESENTATIONS OF NATIVE DATA TYPES TO THIRD-PARTY APPLICATIONS

CROSS REFERENCE TO RELATED APPLICATIONS

This application claims the benefit of U.S. Provisional Application No. 61/664,527, filed on Jun. 26, 2012, which is hereby incorporated herein by reference in its entirety.

TECHNICAL FIELD

In general, this disclosure relates to web-based storage systems, in particular, to systems and methods for exposure of exported representations of native data types to third-party applications.

BACKGROUND

Web-based storage systems are file hosting systems that allow users to store and retrieve data accessible from one or more user devices. These storage systems may use cloud storage to store user data. Sometimes, web-based storage systems store native files, which may be viewed or edited using native applications, and not by standard third-party applications. Thus, the raw content of a file in a native format on a web-storage system is not always accessible to third-party applications.

SUMMARY

Systems and methods are disclosed herein for providing exported representations of native data. One aspect relates to a system or method for exporting a file to an application. A processor receives a request from a user for access to a file stored on a web-based storage system. The request includes a designation of an application to open the file, and the file is associated with a native format. The processor determines that the application is not configured to import the file in the native format and determines whether the file can be converted to an importable format that can be imported by the application. The processor converts the file from the native format to the importable format and exports the converted file in the importable format to the application, which opens the converted file.

In one embodiment, determining whether the file can be converted comprises identifying an exportable format associated with the file that matches an importable format associated with the application. The identifying step comprises cross referencing a list of exportable formats associated with the file and a list of importable formats associated with the application. The list of exportable formats is associated with a first party native application or a third party native application. The cross referencing comprises identifying one or more formats included in both the list of exportable formats and the list of importable formats. The processor receives user input indicative of a desired format when there are multiple matches between the list of exportable formats and the list of importable formats.

In one embodiment, the processor receives an association request to associate an importable format with the application. Optionally, the processor updates a list of importable formats associated with the application based on the association request.

In one embodiment, the exporting step comprises transmitting download data corresponding to the converted file.

BRIEF DESCRIPTION OF THE DRAWINGS

The above and other features of the present disclosure, including its nature and its various advantages, will be more apparent upon consideration of the following detailed description, taken in conjunction with the accompanying drawings in which.

DETAILED DESCRIPTION

To provide an overall understanding of the systems and methods described herein, certain illustrative embodiments will now be described, including a web-based storage system. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more engines, which include a processing device or devices, such as a computer, microprocessor, logic device or other device or processor that is configured with hardware, firmware, and software to carry out one or more of the computerized methods described herein.

The present disclosure provides systems and methods for providing third-party applications with access to file content on a web-based storage system. Sometimes, third-party applications cannot access files that are specially formatted. The systems and methods disclosed herein convert specially formatted files into representations that third parties may access. In particular, the present disclosure relates to a web-based storage system that stores native files and converts the file content in the native files to an exportable format for third parties. The systems and methods disclosed herein are described in terms of a web-based storage system, which may communicate with other systems over a network to store and share user data. In general, one of ordinary skill in the art will understand that the systems and methods described herein are applicable to systems that are locally interconnected without departing from the scope thereof.

Figure 1:
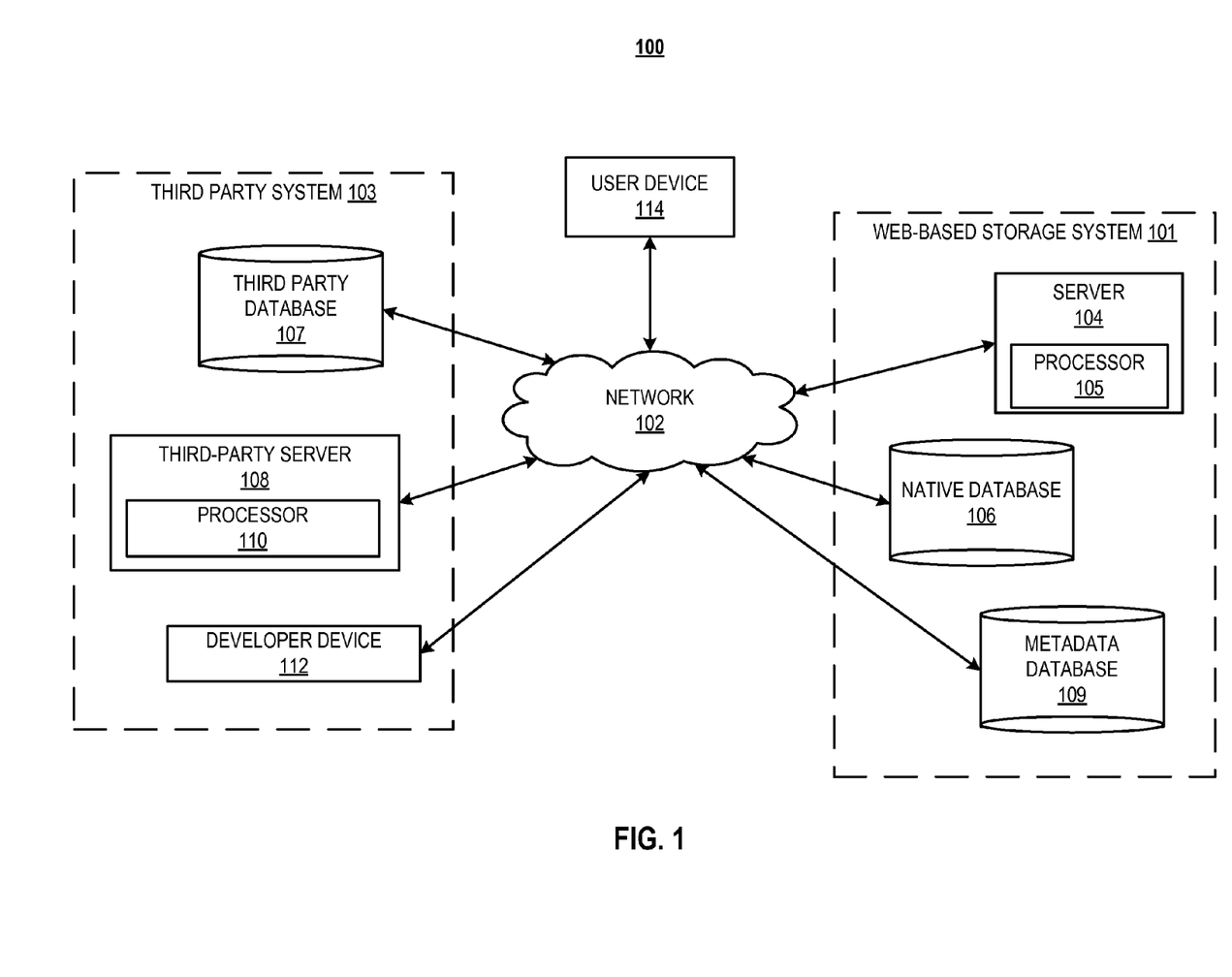
FIG. 1 is a block diagram of a computerized system for providing access to a representation of a file, according to an illustrative embodiment.

FIG. 1 depicts an example of a network and database structure that may be used to implement the systems and methods herein. FIG. 1 is a block diagram of a computerized system 100 for allowing third-party applications to access representations of files stored on a web-based storage system. The system 100 includes a web-based storage system 101, a user device 114, and a third-party system 103. The web-based storage system 101 includes a server 104 including a processor 105, a native database 106, and a metadata database 109. The third-party system 103 includes a third-party database 107, a third-party server 108 including a processor 110, and a developer device 112. As used herein, the term "processor" or "computing device" refers to one or more computers, microprocessors, logic devices, servers, or other devices configured with hardware, firmware, and software to carry out one or more of the computerized techniques described herein. Processors and processing devices may also include one or more memory devices for storing inputs, outputs, and data that are currently being processed. An illustrative computing device 800, which may be used to implement any of the processors and servers described herein, is described in detail with reference to FIG. 8. As used herein, "developer device" and "user device" include, without limitation, any suitable combination of one or more input devices (e.g., keypads, touch screens, trackballs, voice recognition systems, etc.) and/or one or more output devices (e.g., visual displays, speakers, tactile displays, printing devices, etc.). As used herein, "server" includes, without limitation, any suitable combination of one or more devices configured with hardware, firmware, and software to carry out one or more of the computerized techniques described herein. Only one web-based storage system 101, one user device 114, and one third-party system 103 are shown in FIG. 1 to avoid complicating the drawing. In general, the system 100 can support multiple web-based storage systems, third-party systems, servers, databases, developer devices, and user devices.

The web-based storage system 101 is a file hosting system that allows users to store, retrieve, and modify data via one or more user devices such as the user device 114. This data may be referred to as a user's web data. As an example, the web-based storage system 101 may be stored on a single server system or in a distributed system. In particular, the web-based storage system 101 may use cloud storage to store user data.

The metadata database 109 stores several types of data. In particular, the metadata database 109 stores metadata associated with file content stored on the web-based storage system 101 or on the third-party system 103. The metadata may include a shortcut, a reference, or a pointer to the associated file content. For example, the metadata may include a pointer to an original file in a database such as the native database 106 or the third-party database 107. In an example, the metadata database 109 stores binary files associated with binary file content stored on the native database 106. In another example, the metadata database 109 stores reference files for internal, first-party applications (i.e., native applications associated with the web-based storage system) on the native database 106. In another example, the metadata database 109 stores reference files for third-party applications (i.e., associated with the third-party system 103) stored on the third-party database 107, for example.

The native database 106 stores native files, which may be viewed or edited using native applications. Native applications correspond to internal, first-party applications in the web-based storage system 101. As an example, the native application may provide access between the user and the native file over a web browser (i.e., for viewing and/or editing a native document). The native file may be related to a text document, a spreadsheet document, a presentation document, a drawing document, or any other suitable document. In particular, the native database 106 stores native files in a particular format suitable for the web-based storage system 101. A suitable format may be a format specific to the web-based storage system 101, and may be referred to as a "first-party native" format.

The third-party system 103 communicates with the web-based storage system 101 over the network 102 to access a representation of a native file stored on the native database 106. As depicted in FIG. 1, the third-party system 103 includes a third-party database 107, a third-party server 108, and a developer device 112. The third-party database 107 may store third-party native files in a particular format suitable for the third-party system 103. A suitable format may be a format specific to the third-party system 103, and may be referred to as a "third-party" format.

It is sometimes desirable for the third-party application to access the contents of a native file so that the third-party application can operate on file content. The third-party application may be unable to directly access the raw content of the file if the file is a first-party native file or a third-party native file associated with separate third-party application. The case when the file is a first-party native file is described in detail below. However, in general, one of ordinary skill in the art will understand that the systems and methods described herein for providing an exported representation of file content to a third-party application may also be applied to third-party native files associated with one or more other third-party applications.

When the file is a first-party native file, the third-party application may not be configured to directly read or write the first-party native file content because the format of the first-party native file is incompatible with a format that the third-party application is configured to import. In addition, the raw content of a first-party native file may include proprietary information, and it may be undesirable to allow a third-party system 103 to have unrestricted access to the raw content. In order to maintain the proprietary nature of first-party native files in the web-based storage system 101, the raw content of the first-party native files are not directly exposed. Instead, the processor 105 generates a proxy version of the first-party native file in one or more formats suitable for exporting to the third-party system 103. In particular, the native file is converted to a suitable format (that is exportable by the web-based storage system 101 and importable by the third-party system 101), and the third-party application is allowed to access a read-only representation of the native file, without sharing the raw content. The third-party application may use one or more application programming interfaces (APIs) to access the suitable representations of first-party native files.

Figure 2:
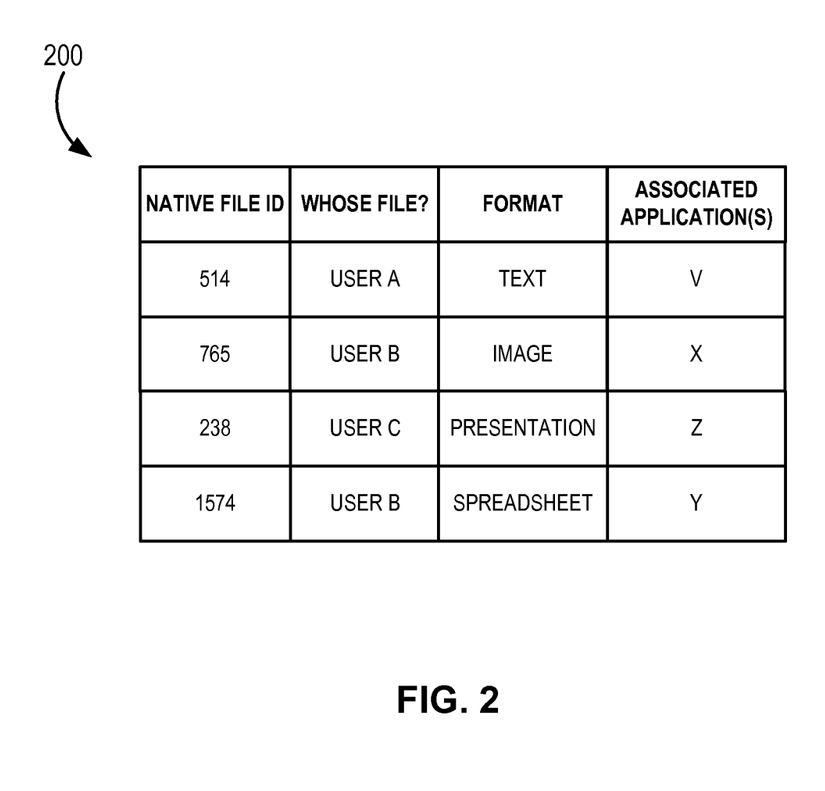
FIG. 2 is an example data structure stored on a native database that includes data related to native files, according to an illustrative embodiment.
Figure 3:
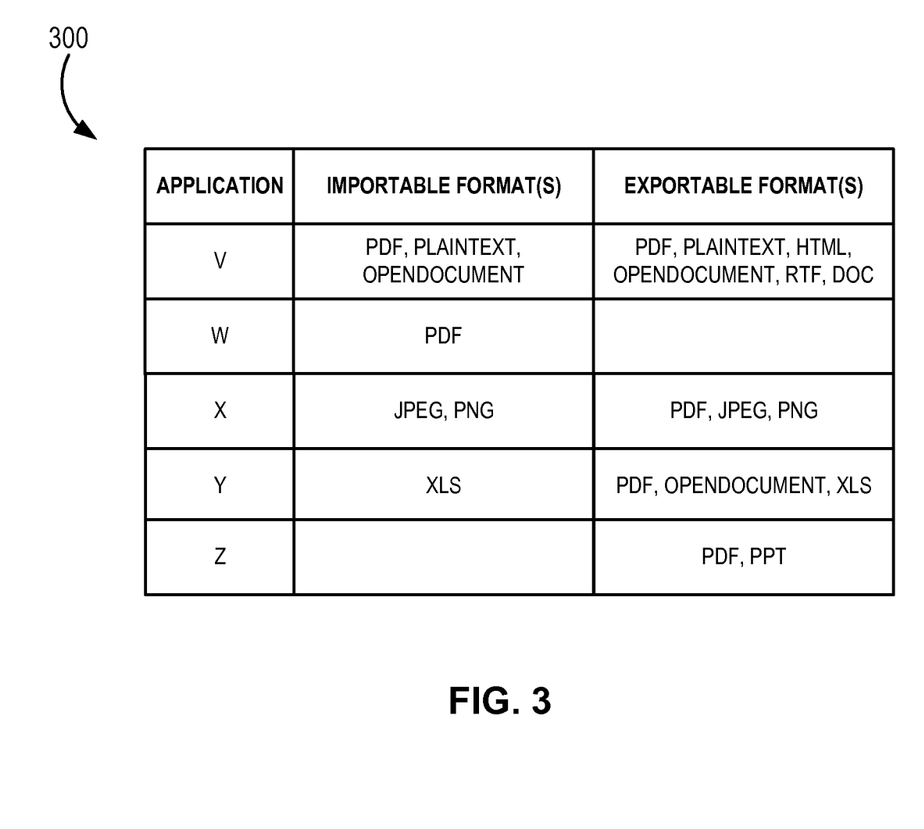
FIG. 3 is an example data structure stored on a third-party database that includes data related to third-party applications, according to an illustrative embodiment.

To provide access of the content of the native file to the third-party application, the processor 105 may identify one or more exportable formats associated with the native file. In particular, to identify one or more exportable formats, the processor 105 may identify one or more applications associated with the native file. In an example, the associated application may be a first-party native application associated with the web-based storage system 101. An example data structure 200 of four native files and their associated applications is shown in FIG. 2. Furthermore, FIG. 3 shows an example data structure 300 of five applications and lists of each application's corresponding importable formats and exportable formats. The data structures 200 and 300 may be stored on any of the databases shown in FIG. 1, such as the third-party database 107, the native database 106, the metadata database 109, or any other suitable database. The processor 105 determines whether there is a match between the set of exportable formats of the application associated with the native file and the set of importable formats associated with the third-party application. If a matching format is identified, then the native file is converted to the matching format. When multiple matching formats are identified, a format may be selected based on user input or default settings. The converted file is then exported to the third-party application, which opens the converted file.

As an example, the third-party application may be a web-based faxing program that is configured to open (or import) files of a certain type (such as image files, for example). The user may wish to use the web-based faxing program (stored on the third-party system 103, for example) to transmit the contents of a native file 514 (stored on the native database 106, for example). As shown in the data structure 200, the contents of the native file 514 include text, and the native file 514 associated with an application V. The application V may be a text editor, for example. The web-based faxing program may be the application W, which is associated with one importable format (pdf) and no exportable formats, as shown in the data structure 300. In this case, the list of exportable formats associated with the application V is compared to the list of importable format(s) associated with the application W to identify if any match exists between the lists. Because the format pdf is the only format included in both lists, the processor 105 converts the native file 514 to a pdf file and exported to the third-party web-based faxing program W.

In another example, the user may wish to provide access of content in a third-party native file to a third-party application that is not associated with the native file. To illustrate this example, the native file 1574 is associated with a third-party application Y, but the user may specify that the desired third-party application is W. In this case, W may be a pdf viewer program, and because the third-party application Y is able to export files in the pdf format, the content of the native file 1574 is converted to pdf format and exported to the third-party application W.

In another example, the user's request to provide access of file content in a native file to a third-party application may be denied if a match is not found between a list of exportable formats corresponding to an associated application of the native file and a list of importable formats corresponding to the third-party application. For example, the user may wish to provide access of content in the native file 238 to the third-party application X. In this case, because the native file 238 is associated with the application Z, and there is no match between the exportable formats associated with the application Z and the importable formats associated with the application X, the user's request is denied.

Thus, while the raw content of a native file may be inaccessible to the third-party system 103, the third-party system 103 may still be able to access the contents of the native file by importing a converted version of the native file. In this way, the system 100 allows third-party applications to access representations of native files stored in the native database 106 without giving access to the raw native file content. The system 100 may provide read-only access to the third-party system 103 so that third-party applications stored on the third-party database 107 may import files in third-party native formats, but may not make any changes to the raw file stored on the native database 106.

In some embodiments, developers of the third-party system 103 create a third-party application version (or "cloud" version) of a software. The third-party server 108 may run the application version and provide a user interface over the network 102 to the user device 114 (over a web browser, for example). In this case, the user interacts with the third-party application over the provided user interface without requiring the third-party software to be locally installed on the user device 114. In some embodiments, the third-party application is related to a software application that is installed locally on the user device 114. For example, the software may include a document editor or viewer, and the user may locally install the software on a device such as a personal computer.

The configuration of the system 100 is advantageous for the user because the system 100 allows a user to access files stored in one location (i.e., the web-based storage system) using a third-party application run at a different location (i.e., the third-party system 103). In this manner, there is no need for the software application to be installed locally on the user device 114. Installing software on a device takes up space in the local memory and takes time to install. In addition, the user may use the third-party applications to access the same native files using any number of different user devices, as long as each user device is configured to communicate with the network 102. By allowing any user device 114 in communication with the network 102 to use third-party applications to access representations of native files, the systems and methods described herein allow for flexible and convenient access to the user's web data.

FIG. 2 is an example data structure 200 stored on the native database 106 that includes data related to native files, according to an illustrative embodiment. The data structure 200 includes a list of four native file identifiers, each corresponding to a native file stored on the native database 106. For each native file, the data structure 200 has a field entry for a user identifier indicating a user associated with the file. In particular, the web-based storage system 101 may be accessed by multiple users and/or application developers, each associated with one or more portions of the web-based storage system 101. The user may access the storage space over the user device 114 and the network 102.

In addition to storing a user identifier associated with the native file, the data structure 200 also includes field entries for the format. In particular, the native file 514 is a native text file associated with the user A, and the native file 238 is a native presentation file associated with the user C. The native file 765 is an image file and the native file 1574 is a spreadsheet file, both associated with the user B.

The data structure 200 further includes a field for one or more applications associated with each native file. The associated applications may be first party applications or third-party applications. As shown in the data structure 200, one application is shown for each native file, but in general, any number of applications may be associated with the native file. Additional entries in the data structure 200 may include identifiers corresponding to these applications, indications of whether the application is a first party or third-party application, dates and times of a previous access of the file content by the associated application, any other suitable data associated with the native file, or a combination thereof. In addition to or instead of the fields shown, the data structure 200 may also include fields for the dates and times the file was created, accessed, or edited, a list of users with permission to read or write the file, any other suitable data associated with a file stored on a storage system, or any suitable combination thereof.

In some embodiments, the format field in the data structure 200 is an "association" field. In particular, an association of a native file may include a list of one or more possible export formats, and a native file may have one or more corresponding associations. As an example, the association stored for the native file 514 includes "text". The association "text" may correspond to a group of one or more formats, including pdf, plaintext, html, opendocument, rtf, and doc, for example. As another example, an association stored for the native file 238 includes "presentation". The association "presentation" may correspond to a group of one or more formats, including pdf and ppt, for example. Storing the associations for the native files rather than storing lists of the possible exportable formats may be advantageous for saving storage space and allowing for more efficient access to the data. In some implementations, the format field and the association field are different fields in the data structure 200.

FIG. 3 is an example data structure 300 that includes data related to applications, according to an illustrative embodiment. The data structure 300 may be stored on the native database 106, the metadata database 109, the third-party database 107, or any other suitable database. The data structure 300 includes five records of applications, each associated with a list of importable formats, and a list of exportable formats. The applications may be first party applications or third-party applications. As an example, the application V is configured to import files in three formats: pdf, plaintext, and opendocument, and is configured to export files in six exportable formats, including pdf, plaintext, html, opendocument, rtf, and doc. In another example, the application Y is configured to import files in xls format. In addition to or in place of the fields shown in the data structure 300, additional fields may be included, such as whether the application is a first party application or a third-party application, a list of native files previously accessed, dates and times of that access, data related to a location of the third-party server 108, any other suitable data related to an application, or a combination thereof. As shown in the data structure 300, an application may have a corresponding empty list of importable formats (the application Z, for example) and/or exportable formats (the application W, for example).

Each application has a corresponding list of supported importable formats and a list of supported exportable formats. The importable formats may include the file formats that the corresponding application is configured to open, or read. The exportable formats may include the file formats that the corresponding application is configured to provide, or write. When the application is a third-party application, one or more developers associated with the third-party application may request to update either list at any time, as is described in relation to FIG. 7. In particular, the lists may include importable file formats that a developer of a third-party application has specified can be imported over the developer's API console using a corresponding third-party application, or the lists may include exportable file formats that the developer has specified can be exported over the developer's API console. When there are multiple developers for a third-party application, the processor 105 may maintain a list for each developer and/or for each third-party application associated with a developer. These lists may be stored together or separately in one or more databases.

The system 100 may update the data structure 300. As another example, a developer of a third-party application may submit a request to the web-based storage system 101 to update the corresponding list of importable formats. For example, the developer of the third-party application Y may have configured the third-party application to import open-document files in addition to xls files. In this case, the developer submits a request to update the data structure 300. The request may include data indicative of the new format to append to the list of importable formats. Similarly, the developer may submit requests to update the data structure 300 to remove a format from the list of corresponding importable formats. The developer may use an API to communicate between the third-party system 103 and the web-based storage system 101. As an example, the third-party developer may use one or more APIs to register a corresponding third-party application with the web-based storage system 101 for initial access to any file, to update a list of importable formats and/or a list of exportable formats associated with a third-party application, to provide a user interface to the user device 114, or any other suitable interaction between the third-party system 103, the web-based storage system 101, and the user device 114.

Figure 4:
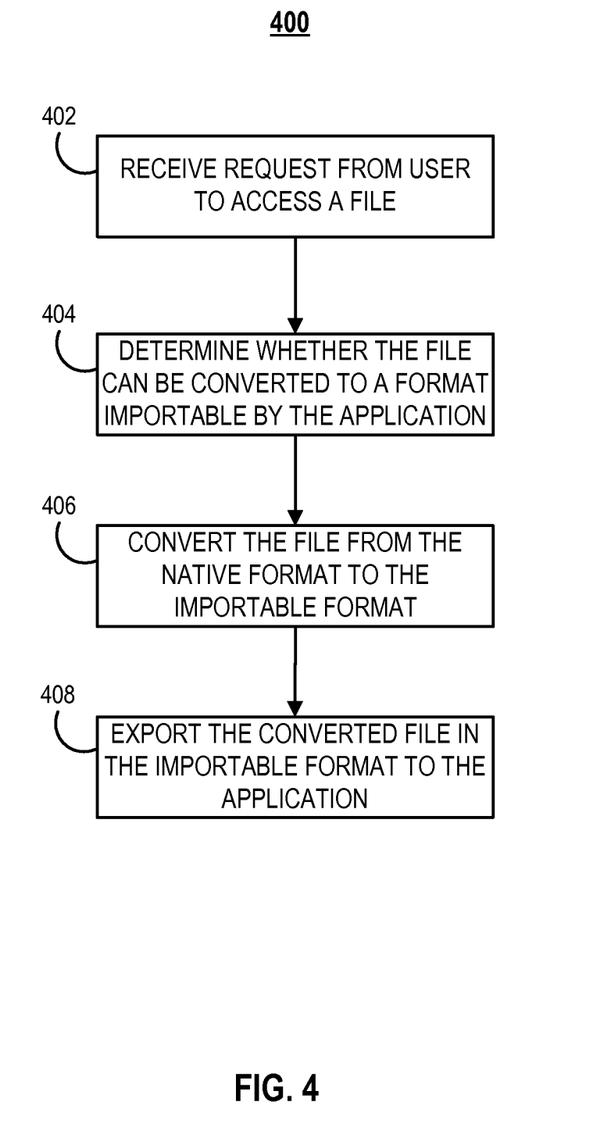
FIG. 4 is a flowchart of a method used by a processor to export a representation of a native file, according to an illustrative embodiment.
Figure 5:
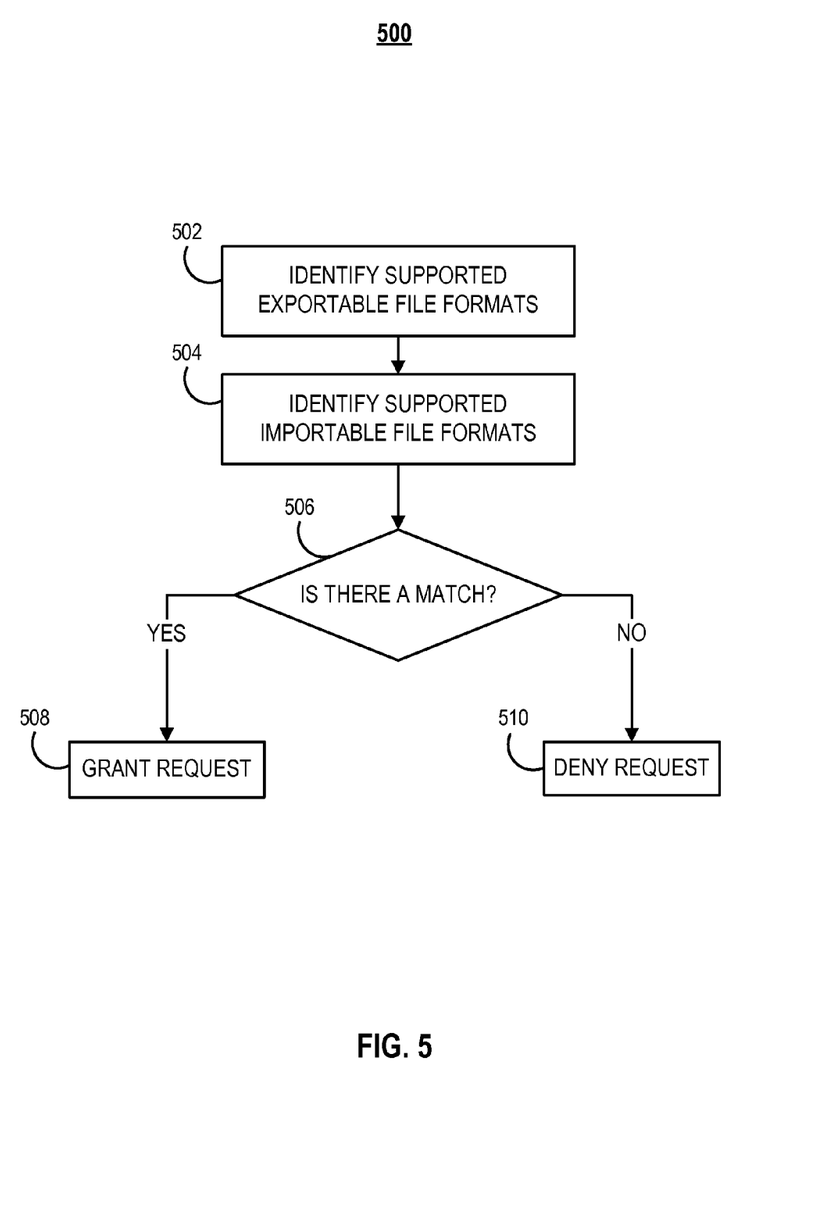
FIG. 5 is a flowchart of a method used by a processor to determine whether to grant or deny a request for access to a representation of a native file, according to an illustrative embodiment.
Figure 6:
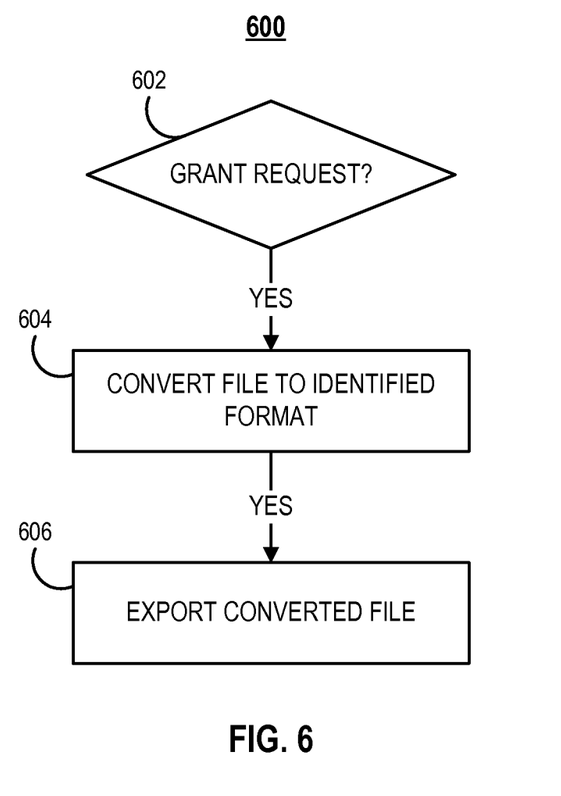
FIG. 6 is a flowchart of a method used by a processor to convert and export a representation of a native file, according to an illustrative embodiment.
Figure 7:
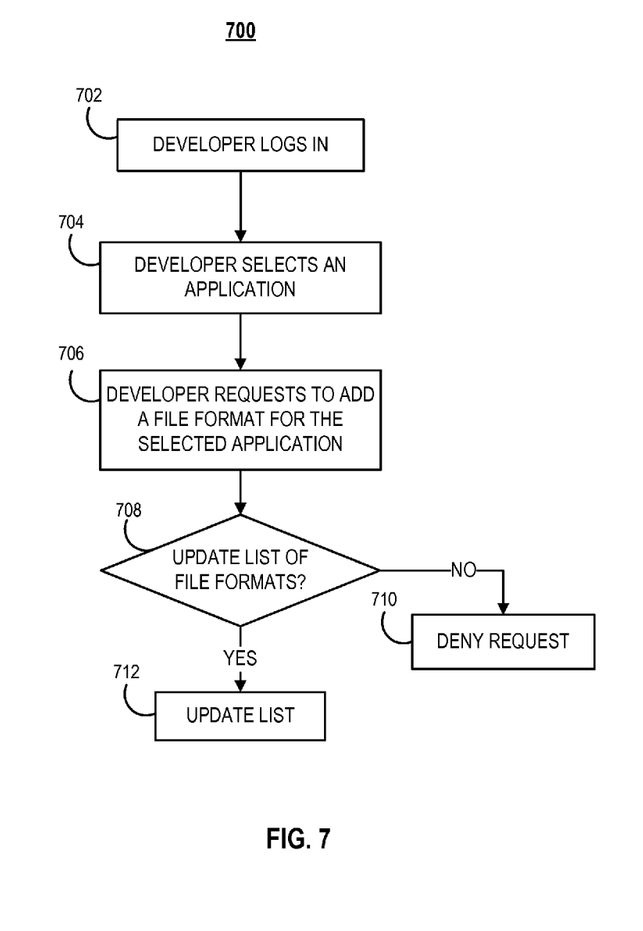
FIG. 7 is a flowchart of a method used by a processor to update a list of file formats associated with a third-party application, according to an illustrative embodiment.

FIGS. 4-7 are flowcharts of methods that may be used by a processor such as processor 105 for performing the techniques described herein. In particular, FIG. 4 is a flowchart of a high level method 400 for exporting a representation of a native file. FIG. 5 is a flowchart of a more detailed method 500 for determining whether to grant or deny a request for access to a representation of a native file, and if the request is granted, FIG. 6 is a flowchart of a method 600 for converting and exporting a representation of a native file. FIG. 7 is a flowchart of a method for updating a list of file formats associated with a third-party application.

FIG. 4 is a flowchart of a method 400, as performed by the processor 105, for exporting a representation of a native file, according to an illustrative embodiment. The method 400 includes the steps of receiving a request from a user to access a file (step 402), determining whether an exportable format of the native file matches an importable format (step 404), and exporting a representation of the file based on the determination (step 406).

At step 402, the processor 105 receives a request from a user to access the contents of a native file using a third-party application. The request may include an identifier of the native file and an identifier of the third-party application. The native file is stored on the native database 106 and may be associated with the user, such as the user A. As an example, the native file may be stored on a portion of the native database 106 allocated to the user A (i.e., the native file 514). In this case, the user A may provide user authentication information (i.e., by providing a username and password or other identification information to a user interface on a web browser, for example) at the user device 114. After authentication, the user device 114 may display a list of folders and files associated with the user A stored on the native database 106, including the native file 514. In another example, the native file may be associated with the user B, who has given access to the user A of the native file (i.e., the native file 765). In this case, the user B may provide the user A with a link or shortcut to the native file 765, and a data structure such as the data structure 200 may include a data field entry for a list of users with permission to read or write a native file. After the data structure 200 is updated to include that the user A has permission to read the native file 765, the user device 114 may display a form of the native file 765 to the user A after authentication. For ease of illustration, the remainder of the description herein relates to the user A requesting to access a representation of the native file 514 using the third-party application W.

The user A may transmit a request to access the native file 514 using the third-party application W over the user device 114. For example, the user A may use a user input device such as a keyboard or a mouse at a user interface on the user device 114 to indicate the request. For example, after providing user authentication information over the user interface, the user device 114 displays metadata associated with the native file 514. In particular, the metadata may include a file name, a date and time created, a native format, or any other suitable metadata associated with a native file. The metadata may be stored on the metadata database 109, on the native database 106, or any other suitable database in communication with the network 102. The user A may select the native file 514 and request to access the native file 514 by selecting from a list of third-party applications that may be suitable for importing a representation of the native file 514. For example, the list of third-party applications may include an online document editor, an online document viewer, a web-based faxing program, or any other suitable third-party application that is configured to import an exportable format associated with the native file 514. For example, the list of third-party applications may include the third-party applications W and V, which are both configured to import pdf files, and the user A selects the third-party application V to access the native file 514.

In some embodiments, the processor 105 performs some processing to identify an appropriate list of third-party applications to be displayed to the user when the user selects the native file. For example, an appropriate list may include each application that is configured to import files of a format corresponding to the native file. In this case, regardless of which application the user selects from the list, the processor 105 will grant the request. In another example, an appropriate list may include all applications associated with the user, such that after the user selects the desired application from the list, the processor 105 performs additional processing to determine whether to grant or deny the request.

In some embodiments, the desired third-party application is not listed when the user A selects the native file 514. As an example, the data structure 300 may not include pdf as an importable format associated with the third-party application W. In this case, a developer of the third-party application W may not yet have registered the application to be configured to import pdf files. In this case, the user A may submit a request to register the third-party application Z to import pdf files. The user A may transmit the request directly to the web-based storage system 101. Alternatively, the user A may transmit the request to the third-party system 103, which then transmits the request to the web-based storage system 101.

At step 404, the processor 105 determines whether the native file can be converted to a format importable by the third-party application. In particular, the third-party application is not configured to import the file in the native format, but may be configured to import a file in a third-party format. To determine whether the file can be converted to a suitable format, the processor 105 identifies a list of exportable formats of an application associated with the native file and a list of importable formats associated with the third-party application (i.e., the lists stored in the data structure 300, for example). After identifying the lists of importable and exportable file formats, the processor 105 may cross reference both lists to identify any file formats that are listed in both lists. For example, when cross referencing the list of exportable formats associated with the native file 514 (in the data structure 200) and the list of importable formats associated with the third-party application Z (in the data structure 300), the processor 105 identifies that a matching file format is a pdf. This process is described in more detail in relation to FIG. 5.

If multiple matching file formats are identified, the processor 105 may prompt the user to provide input regarding which of the matching file formats should be used. Alternatively, the third-party application may provide data to the processor 105 indicative of a preferred order of formats, such that the importable formats associated with a third-party application may have relative priorities. In this case, the matching file format with the highest priority is identified.

At step 406, the processor 105 converts the file content from the native format to a suitable importable format. In converting the native file, the processor 105 may be configured to save the converted file as a new file in addition to the original native file. This may be desirable for allowing the third-party application access to the contents of the native file without changing the format of the original native file. To save the converted file, a reference file or a pointer referring to the original native file may be generated and stored on the metadata database 109. To create the new converted file, the processor 105 may then operate on the reference file. The processor may use an application associated with the native file to perform the conversion. In general, converting the native file may include compressing data in a file, performing optical character recognition of an image to retrieve text content, or any other suitable method of converting file content into a form different from an original form. This process is described in more detail in relation to FIG. 6.

At step 408, the processor 105 exports the converted file in the importable format to the third-party application. To export the converted file, the processor 105 may transmit the converted file over the network 102 to the third-party system 103 so that the third-party application may access the file content. The user may interact with the third-party application and the web-based storage system 101 over a web browser to access the converted file content. As an example, the processor 105 may transmit a download link to the user or to the third-party system 103 for direct download of the converted file. In this case, the download link may include a hyperlink, url, link, shortcut, reference file, or any other suitable download link for providing a file. In addition, the download link may have a reference to the original native file stored on the native database 106, with the addition of an indication of the converted file format. This process is described in more detail in relation to FIG. 6.

FIG. 5 is a flowchart of a method 500, as performed by the processor 105, for determining whether to grant or deny a request for access to a representation of a native file, according to an illustrative embodiment. This request may be referred to as an access request. The method 500 includes the steps of identifying supported exportable file formats associated with the native file (step 502), identifying supported importable file formats associated with a third-party application (step 504), determining whether there is a match between the exportable and importable file formats (decision block 506), and if a match is found, the access request is granted (step 508). Alternatively, if a match is not found, the access request is denied (step 510).

At step 502, the processor 105 identifies supported exportable file formats associated with the native file. As an example, a list of supported exportable file formats may be stored in a data structure such as the data structure 200. At step 504, the processor 105 identifies supported importable file formats associated with the third-party application. As an example, a list of supported importable file formats may be stored in a data structure such as the data structure 300.

At decision block 506, the processor 105 determines whether there is a match between the lists of importable and exportable file formats. In particular, the processor 105 may cross reference the lists to identify, if any, a match between the two lists. As an example, when cross referencing the list of exportable formats associated with the native file (i.e., in the data structure 200) and the list of importable formats associated with the third-party application (i.e., in the data structure 300), the processor 105 may identify more than one, one, or zero matching file formats. In particular, if multiple matching file formats are identified, the processor 105 may prompt the user to provide input regarding which of the matching file formats should be used. Alternatively, the third-party application may provide data to the processor 105 indicative of a preferred order of formats, such the importable formats associated with a third-party application may have relative priorities. In this case, the matching file format with the highest priority is identified. If one matching file format is identified, the identified matching file format is used in granting the access request. In some embodiments, the processor 105 cross references the two lists by determining the set intersection of the two lists. Specifically, the set intersection of the two lists includes the set of file formats that appear in both lists.

If one or more matching file formats are identified at the decision block 506, the processor 105 grants the access request at step 508. In particular, to grant the access request, the processor 105 converts the native file into the identified file format and exports the converted file to the third-party application. This process is described in more detail in relation to FIG. 6.

If no native file formats of previously accessed files match the file format of the requested native file, the processor 105 proceeds to step 510 to deny the access request. In particular, to deny the access request, a message may be displayed to the user indicating that the system 100 is unable to provide a representation of the requested native file using the requested third-party application. Alternatively, the processor 105 may perform the steps of FIG. 5 before the user selects a third-party application. In this case, the processor 105 may perform the steps of the method 500 to identify an appropriate list of applications to display to the user, where each application in the displayed list is configured to import a file format corresponding to an exportable format associated with the native file. In this case, any selection that the user makes from the displayed list will result in an exportation of the file content to the selected application.

FIG. 6 is a flowchart of a method 600, as performed by the processor 105, for converting and exporting a representation of a native file, according to an illustrative embodiment. The method 600 includes the steps of determining to grant a request from a user (decision block 602), converting the file to an identified file format (step 604), and exporting the converted file to a third-party application (step 606).

At step 602, the processor 105 determines whether to grant a request from a user to export a representation of a native file to a third-party application. The determination of whether to grant the request may be determined based on a cross referencing between two lists of file formats: a list of exportable file formats associated with the requested native file and a list of importable file formats associated with the third-party application. As described in relation to FIG. 5, the result of the cross referencing is an identification of any format(s) included in both lists. In some embodiments, the third-party application has a defined scope of access associated with a user. In this case, the determination of whether to grant the access request may be based at least in part on the defined scope of access.

At step 604, if the processor 105 determines to grant the access request, the processor 105 converts the request native file to an identified file format. In converting the native file, the processor 105 may be configured save the converted file as a new file in addition to the original native file. In some embodiments, the processor 105 creates a reference file or a pointer referring to the original file. The reference file or pointer may be stored on the metadata database 109 or any other suitable database in communication with the network 102. The processor 105 then operates on the reference file to create the new converted file. This may be desirable for creating converted representations of files while allowing the format of the original native file to remain intact.

As an example, the native file may be a text document, and the third-party application is a web-based faxing program that is configured to receive pdf files. The user may wish to transmit the data in the native text document via fax, but also wishes to keep the raw data in the original text format intact. One way the processor 105 converts the native file is to create a copy of the native file and operate on the copy (i.e., convert the copy to pdf format). Another way to convert the native file is to create a pointer to the native file and operate on the pointer to create a pdf version of the native file.

In general, converting the native file may include converting any type of file to an image file as described above for a text file, compressing data in a file such as an image, performing optical character recognition of an image to retrieve some text in an image file, or any other suitable method of converting file content into a form different from an original form.

At step 606, the processor 105 exports the converted file. As an example, the processor 105 may transmit the converted file or a representation thereof to the third-party system 103 so that the user may access the file using the third-party application. In particular, the user may use a web browser to access the web-based storage system 101. The web browser may generate a display screen with a user interface corresponding to the third-party application. For example, the third-party server 108 may run the third-party application on the third-party system 103, and provide an interface (or data indicative of the desired user interface) to the web-based storage system 101, which then displays the user interface to the user device 114. Alternatively, the third-party server 108 may display the user interface directly to the user device 114 over the network 102.

To transmit the converted file, the processor 105 may transmit a download link to the user or to the third-party system 103 for direct download of the converted file. In this case, the download link may include a hyperlink, url, link, shortcut, reference file, or any other suitable download link for providing a file. In addition, the download link may have a reference to the original native file stored on the native database 106, with the addition of an indication of the converted file format.

After the converted file has been successfully transmitted, the web-based storage system 101 may accordingly update the appropriate data structure(s) such as the data structures 200 and 300 to indicate which native files have been accessed by which third-party applications. In addition, the converted files and/or any data created during the conversion process (such as pointer or reference files that may be stored in the metadata database 109) may be saved, compressed, or deleted.

FIG. 7 is a flowchart of a method 700, as performed by the processor 105, for updating a list of file formats associated with a third-party application, according to an illustrative embodiment. The method 700 includes the steps of a developer logging into the system 100 (step 702), receiving a selection of a third-party application from the developer (step 704) and receiving a request from the developer to add a supported importable file format for the selected application (step 706). If the processor 105 determines to grant the request and update the list of file formats associated with the application (decision block 708), the list is updated (step 712). Otherwise, the request is denied (step 710).

At step 702, a developer logs into the system 100. As an example, the developer may authenticate with the web-based storage system 101 by inputting a username and password (or providing other identification information) via the developer device 112. Upon determining that a developer has logged in, the processor 105 may access one or more lists associated with the developer. In particular, the developer may be associated with one or more third-party applications on the third-party system 103, and a data structure such as the data structure 300 may be stored for each third-party application.

At step 704, the developer selects a third-party application. In particular, the developer may be associated with multiple third-party applications stored on one or more third-party systems 103, and the developer may have a developer account with the system 100 which associates the developer with each of these applications. In addition, the same third-party application may have different release versions, and the different versions of the same application may have different lists of supported importable file formats. Thus, at step 704, the developer may specify a version identifier in addition to a third-party application. As an example, after logging in, the developer may be presented with a menu of associated third-party applications and their version identifiers. The developer may select an application by selecting an option from the menu. In another example, the developer may add an application or a new version of an application to the developer's account. In this case, the developer provides data indicative of the new application or version, and the web-based storage system 101 may associate the developer's account with the new application or version.

At step 706, the developer transmits a request to add a file format to the list of supported importable file formats for the selected third-party application. In particular, the selected third-party application may have been recently updated to support a new importable file format. As another example, the developer may register a new application or application version with an empty list of supported importable file formats. In this case, the developer's request at step 706 is an initial request to add an importable file format to be associated the new application or version.

At decision block 708, the processor 105 determines whether to grant the developer's request at step 706 by updating the list of supported importable file formats. As an example, the processor 105 may deny the request at step 710 if it is determined that the developer does not have appropriate access levels to make such a request for the third-party application. Alternatively, at step 712, the processor 105 updates the list of supported importable file formats corresponding to the selected third-party application. In particular, the list is updated to include the requested file format. In some embodiments, the request at step 706 may be a request to delete or replace an existing file format in the list, and the list is updated accordingly at step 712.

In general, the systems and methods disclosed herein for the interaction between a developer and the web-based storage system 101 may include the use of an API for providing an interface between the two systems.

Figure 8:
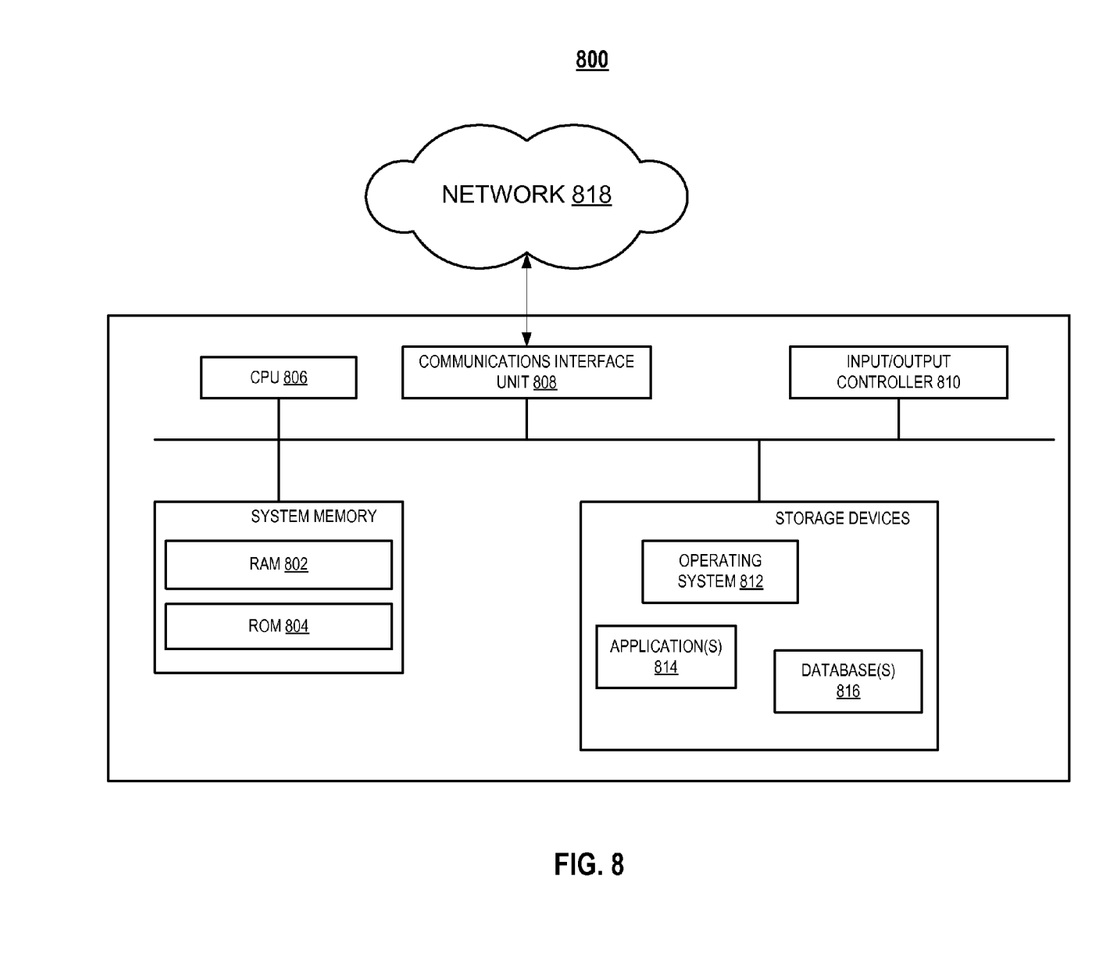
FIG. 8 is a block diagram of a computing device for performing any of the processes described herein, according to an illustrative embodiment.

The components of the system 100 of FIG. 1 may be arranged, distributed, and combined in any of a number of ways. FIG. 8 is a block diagram of a computing device, such as any of the components of the system of FIG. 1, for performing any of the processes described herein, according to an illustrative embodiment. Each of the components of these systems may be implemented on one or more computing devices 800. In certain aspects, a plurality of the components of these systems may be included within one computing device 800. In certain implementations, a component and a storage device may be implemented across several computing devices 800.

The computing device 800 comprises at least one communications interface unit, an input/output controller 810, system memory, and one or more data storage devices. The system memory includes at least one random access memory (RAM 802) and at least one read-only memory (ROM 804). All of these elements are in communication with a central processing unit (CPU 806) to facilitate the operation of the computing device 800. The computing device 800 may be configured in many different ways. For example, the computing device 800 may be a conventional standalone computer or alternatively, the functions of computing device 800 may be distributed across multiple computer systems and architectures. In FIG. 8, the computing device 800 is linked, via network or local network, to other servers or systems.

The computing device 800 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 808 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 806 comprises a processor, such as one or more conventional microprocessors and one or more supplementary co-processors such as math co-processors for offloading workload from the CPU 806. The CPU 806 is in communication with the communications interface unit 808 and the input/output controller 810, through which the CPU 806 communicates with other devices such as other servers, user terminals, or devices. The communications interface unit 808 and the input/output controller 810 may include multiple communication channels for simultaneous communication with, for example, other processors, servers or client terminals in the network 818.

The CPU 806 is also in communication with the data storage device. The data storage device may comprise an appropriate combination of magnetic, optical or semiconductor memory, and may include, for example, RAM 802, ROM 804, flash drive, an optical disc such as a compact disc or a hard disk or drive. The CPU 806 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 806 may be connected to the data storage device via the communications interface unit 808. The CPU 806 may be configured to perform one or more particular processing functions.

The data storage device may store, for example, (i) an operating system 812 for the computing device 800; (ii) one or more applications 814 (e.g., computer program code or a computer program product) adapted to direct the CPU 806 in accordance with the systems and methods described here, and particularly in accordance with the processes described in detail with regard to the CPU 806; or (iii) database(s) 816 adapted to store information that may be utilized to store information required by the program.

The operating system 812 and applications 814 may be stored, for example, in a compressed, an uncompiled and an encrypted format, and may include computer program code. The instructions of the program may be read into a main memory of the processor from a computer-readable medium other than the data storage device, such as from the ROM 804 or from the RAM 802. While execution of sequences of instructions in the program causes the CPU 806 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to providing access to third-party systems to file content as described herein. The program also may include program elements such as an operating system 812, a database management system and "device drivers" that allow the processor to interface with computer peripheral devices (e.g., a video display, a keyboard, a computer mouse, etc.) via the input/output controller 810.

The term "computer-readable medium" as used herein refers to any non-transitory medium that provides or participates in providing instructions to the processor of the computing device 800 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 806 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 800 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

The invention claimed is:

1. A method for exporting a file to an application, comprising:
    receiving, by a processor, a request from a user for access to a file stored on a web-based storage system, wherein:
        the request includes a designation of an application to open the file; and
        the file is associated with a native format;
    determining, by the processor, that the application is not configured to import the file in the native format;
    determining, by the processor, whether the file can be converted to an importable format that can be imported by the application by cross referencing a list of exportable formats associated with the file and a list of importable formats associated with the application to identify a match between the list of exportable formats and the list of importable formats, wherein:
        the list of exportable formats associated with the file is determined by identifying one or more applications associated with the native format,
        each of the one or more applications is associated with a corresponding list of exportable formats that indicate file formats that the one or more applications is configured to provide,
        each of the one or more applications is associated with a corresponding list of importable formats that indicate file formats that the one or more applications is configured to open,
        the list of exportable formats associated with the file is the union of the corresponding lists of exportable formats for the one or more applications, and
        the list of exportable formats is associated with a first party native application that is specific to the web-based storage system, such that the file in the native format includes proprietary content that is specific to the web-based storage system and that the application is prohibited from accessing;
    converting, by the processor, the file from the native format to the importable format corresponding to the match, wherein the converting comprises removing the proprietary content from the file in the native format;
    exporting, by the processor, the converted file in the importable format to the application, wherein the exporting comprises transmitting download data corresponding to the converted file; and
    opening, by the application, the converted file.

2. The method of claim 1, wherein the cross referencing comprises identifying one or more formats included in both the list of exportable formats and the list of importable formats, the list of exportable formats includes file formats for which the file is capable of being converted into, and the list of importable formats includes file formats for which the application is capable of opening.

3. The method of claim 1, further comprising receiving, by the processor, user input indicative of a desired format when there are multiple matches between the list of exportable formats and the list of importable formats.

4. The method of claim 1, further comprising receiving, by the processor from a developer of the application, an association request to associate an importable format with the application, wherein the developer of the application transmits the association request to indicate that the application is compatible with the importable format included in the association request.

5. The method of claim 4, further comprising updating, by the processor, a list of importable formats associated with the application based on the association request by adding the importable format included in the association request to the list of importable formats.

6. The method of claim 1, further comprising saving the converted file by generating a pointer referring to the file in the native format without modifying the file in the native format.

7. The method of claim 1, wherein the list of exportable formats is associated with a third party native application that is specific to a third party system that is different from the web-based storage system, such that the file in the native format includes proprietary content that is specific to the third party system and that the application is prohibited from accessing, and the converting the file from the native format to the importable format comprises removing the proprietary content.

8. A system for exporting a file to an application, comprising:
    a receiver configured to receive a request from a user for access to a file stored on a web-based storage system, wherein:
        the request includes a designation of an application to open the file; and
        the file is associated with a native format; and
a hardware processor configured to:
    determine that the application is not configured to import the file in the native format;
    determine whether the file can be converted to an importable format that can be imported by the application by cross referencing a list of exportable formats associated with the file and a list of importable formats associated with the application to identify a match between the list of exportable formats and the list of importable formats, wherein:
        the list of exportable formats associated with the file is determined by identifying one or more applications associated with the native format,
        each of the one or more applications is associated with a corresponding list of exportable formats that indicate file formats that the one or more applications is configured to provide,
        each of the one or more applications is associated with a corresponding list of importable formats that indicate file formats that the one or more applications is configured to open,
        the list of exportable formats associated with the file is the union of the corresponding lists of exportable formats for the one or more applications, and
        the list of exportable formats is associated with a first party native application that is specific to the web-based storage system, such that the file in the native format includes proprietary content that is specific to the web-based storage system and that the application is prohibited from accessing;
    convert the file from the native format to the importable format corresponding to the match, wherein the hardware processor is configured to convert the file by removing the proprietary content from the file in the native format; and
    export the converted file in the importable format to the application, wherein the hardware processor exports by transmitting download data corresponding to the converted file.

9. The system of claim 8, wherein the cross referencing comprises identifying one or more formats included in both the list of exportable formats and the list of importable formats, the list of exportable formats includes file formats for which the file is capable of being converted into, and the list of importable formats includes file formats for which the application is capable of opening.

10. The system of claim 8, wherein the receiver is further configured to receive user input indicative of a desired format when there are multiple matches between the list of exportable formats and the list of importable formats.

11. The system of claim 8, wherein the receiver is further configured to receive an association request from a developer of the application to associate an importable format with the application, wherein the developer of the application transmits the association request to indicate that the application is compatible with the importable format included in the association request.

12. The system of claim 11, wherein the hardware processor is further configured to update a list of importable formats associated with the application based on the association request by adding the importable format included in the association request to the list of importable formats.

13. The system of claim 8, wherein the hardware processor is further configured to save the converted file by generating a pointer referring to the file in the native format without modifying the file in the native format.

14. The system of claim 8, wherein the list of exportable formats is associated with a third party native application that is specific to a third party system that is different from the web-based storage system, such that the file in the native format includes proprietary content that is specific to the third party system and that the application is prohibited from accessing, and the converting the file from the native format to the importable format comprises removing the proprietary content.

* * * * *